350-3.68 SR

OR 3,572,881

X 3031 Y

[11] 3,572,881

[72] Inventors Nobuo Nishida; Mitsuhito Sakaguchi, Tokyo-to, Japan

[21] Appl. No. 845,243
[22] Filed July 28, 1969
[45] Patented Mar. 30, 1971
[73] Assignee Nippon Electric Company Limited Tokyo-to, Japan
[32] Priority Aug. 16, 1968
[33] Japan
[31] 43/58819

[54] LARGE-CAPACITY ASSOCIATIVE MEMORY EMPLOYING HOLOGRAPHY

5 Claims, 4 Drawing Figs.

[52] U.S. Cl. ........ 350/3.5, 250/219, 340/173, 350/160
[51] Int. Cl. ........ G02b 27/00
[50] Field of Search ........ 350/3.5; 340/173, 146.3; 250/219, (Inquired)

[56] References Cited

UNITED STATES PATENTS 3,296,594 1/1967 Van Heerden ........ 350/3.5

FOREIGN PATENTS 451,571 2/1968 Switzerland ........ 350/3.5

*Primary Examiner*—David Schonberg
*Assistant Examiner*—Ronald J. Stern
*Attorney*—Ostrolenk, Faber, Gerb and Soffen

ABSTRACT: Interference patterns representing data groups are formed in recording plates, which patterns are aligned in a direction transverse to the surface of the recording plate to provide volume, as opposed to surface, recording. The interference patterns are formed by the combination of:

Figure 1:
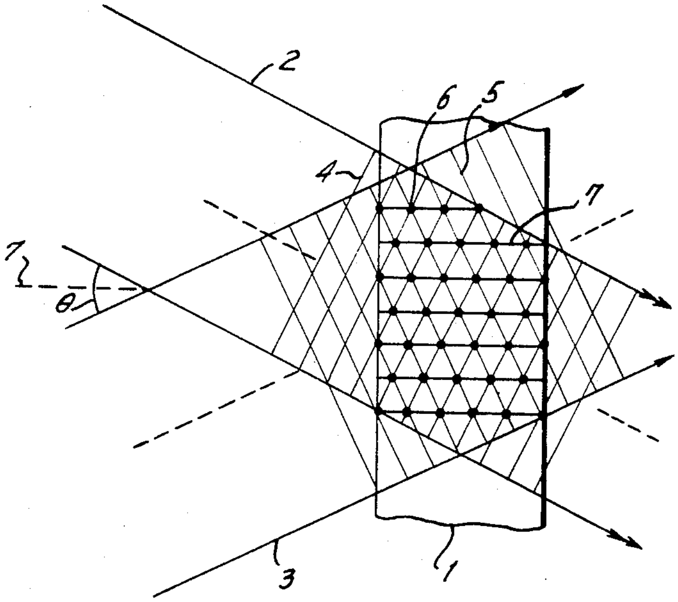

1. spatially modulating a first coherent light source with one of a plurality of data plates; only one region of the recording plate is exposed to the above combination of light rays for each data plate;
2. parallel coherent beams spatially modulated in accordance with a binary code and its complement, said code being unique to each data plate;
3. a third coherent light source whose angle of incidence on the recording plate varies for each data plate.

Retrieval is performed by:

1. spatially modulating the data parallel light beams with the complement of at least selected bits of the binary code;
2. observing, behind the recording plate, those regions which do not pass a light ray; and
3. exposing the recording plate to the parallel light rays in sequential fashion only those regions which do not pass light rays so as to view the data groups having binary code positions common to the retrieval data applied, in complementary form, to modulate the parallel coherent light rays.

INVENTORS
NOBUO NISHIDA
MITSUHITO SAKAGUCHI
BY
OSTROLENK, FABER, GERB & SOFFEN
ATTORNEYS

INVENTORS
NOBUO NISHIDA
MITSUHITO SAKAGUCHI
BY
OSTROLENK, FABER, GERB & SOFFEN
ATTORNEYS

LARGE-CAPACITY ASSOCIATIVE MEMORY EMPLOYING HOLOGRAPHY

This invention relates to an associative information storage system employing holography and, more particularly, to a high-density, large-capacity associative memory system of the volume hologram type wherein the interference patterns are recorded in a photographic or other suitable recording plate in a direction transverse to the planar surface thereof.

The employment of associative memory systems has been proposed to facilitate information retrieval for purposes such as data classification or word-to-word translation.

In systems of this type, the content of the stored data itself serves as a clue to provide access thereto without resorting to the address assigned to each group of the stored data. Among the conventional associative memory systems, there is one proposed by Bell Telephone Laboratories and published in Japan under Patent Publication No. 21900/68. This system employs magnetic thin film, core, and other magnetic memories as the storage elements. Another proposal by R. Igarashi published in the Proceedings of Spring Joint Computer Conference, 1967, p. 499—506 resorts to MDS-type transistors. The disadvantage common to these conventional associative memories is that they are very costly to manufacture as well as having a rather limited storage capacity, principally because virtually double the number of memory elements are needed to make the associative memory feasible. Stated more specifically with regard to the Bell Telephone Memory proposal, one bit of data, stored in the "associative" fashion, requires magnetic core memories twice to four times as great in number as conventional nonassociative memories. On the other hand, since information processing systems, such as data retrieval or word-to-word translation system, can not be put into practical use until an associative memory of sufficiently high capacity is employed, the manufacturing cost per bit of the associative memory should be as low as possible.

In the copending U.S. Pat. application Ser. No. 812,069, filed on Apr. 1, 1969, the inventors of the present invention proposed a novel associative memory system employing holography to satisfy the above-mentioned requirements. Since a detailed description of the associative memory system and of the application of holography thereto is given in the specification of the above-mentioned copending application, a detailed description will not be given in this specification for purposes of simplicity. Briefly, the invention of the aforesaid copending application is adapted to record upon photographic plates, the interference pattern formed between a pair of laser beams which are spatially modulated respectively by two information signals independent of one another. In the read-out phase, interrogation light beams spatially modulated by interrogation data are projected on the photographic plate to carry out information retrieval in the "associative" fashion. As is detailed in the copending application, the interrogation light rays represent a combination of bits which are respectively complementary to those of the interrogation data.

Although the invention of the prior application has made it possible to provide an associative memory system of a considerably large capacity without involving the problem of high manufacturing cost, the increase in the memory capacity is rather limited. The reason for this is that the recording of the interference patterns on the plane of the photographic plate is directly affected by the resolving power of the beam reflecting device, the diffraction limit, and others. The result of a series of experiments performed by the inventors with respect to the system of the copending case shows that each elementary hologram on the photographic plate occupies an area of at least 0.5 mm. × 0.5 mm. This means the bit density is at most 106 bit/cm.$^2$. With this bit density, the system of the prior application can not be said to have attained the objective satisfactorily.

On the other hand, various proposals have been made to increase the capacity of the holographic memory system. In those proposals, alkaline halide crystals and photochromic glass plates are employed in place of this photographic plate. Even if those recording media are employed, the limitation on the memory capacity involved in the system of the prior application can not be obviated because it is attributed, as has been mentioned above, to other factors such as the resolving power and the diffraction limit of the beam-deflection or beam-distributing means.

It is therefore the object of the present invention to provide an associative memory system employing holography, whose memory capacity is remarkably increased by a technique in which interference patterns are recorded in a direction which is transverse, and not parallel, to the plane of the recording plate. More specifically, it is the object of the present invention to provide a holographic associative memory system which is an improvement over the system of the copending application attained by recording the interference patterns in the volume hologram fashion or, in other words, in a direction transverse to the plane of the recording plate.

It is known among engineers of ordinary skill in this technical field that a plurality of mutually different optical images can be stored in a relatively thick photographic plate by slightly changing the angle of incidence of the subject light rays every time the optical image is changed. In the holographic memory system based on this principle, the interference patterns are not formed on the photographic plate in the direction parallel to the plane of the plate, but are formed in the plate in a direction which forms an arbitrary angle with the plane of the plate. Therefore, in the read-out phase, the output image is produced through the Bragg's reflection and not through the regular diffraction observed in the common hologram where the interference patterns are formed on the plane of the plate.

This invention resides in the application of the interference pattern recording in the above-mentioned volume hologram fashion to the holographic associative memory system of the copending application. Since this type of interference pattern recording allows a much greater number of bits to be stored on a single recording plate, the memory capacity is remarkably increased compared with the basic system of the copending application.

Figure 2:
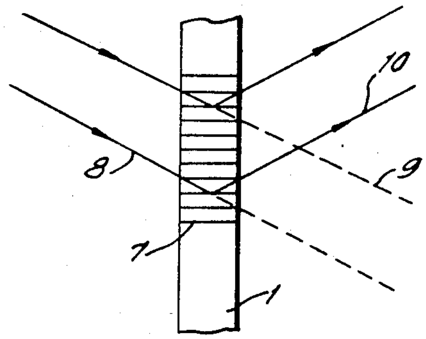
Figure 3:
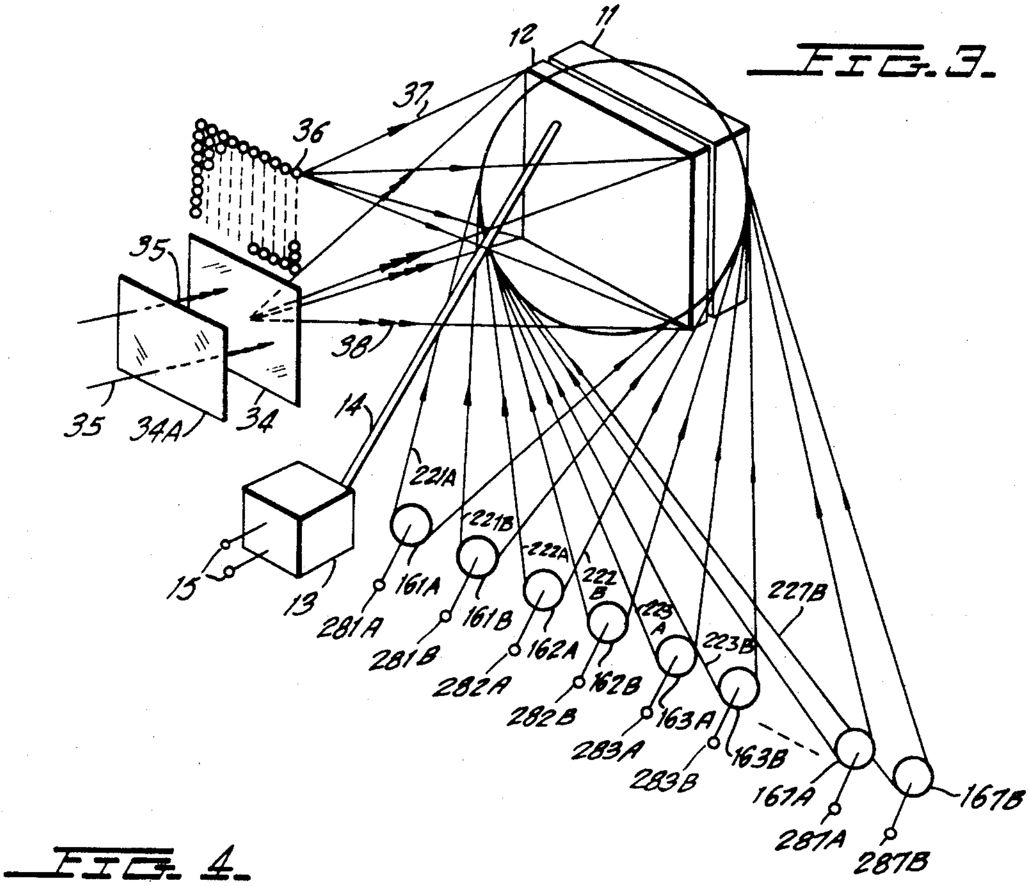
Figure 4:
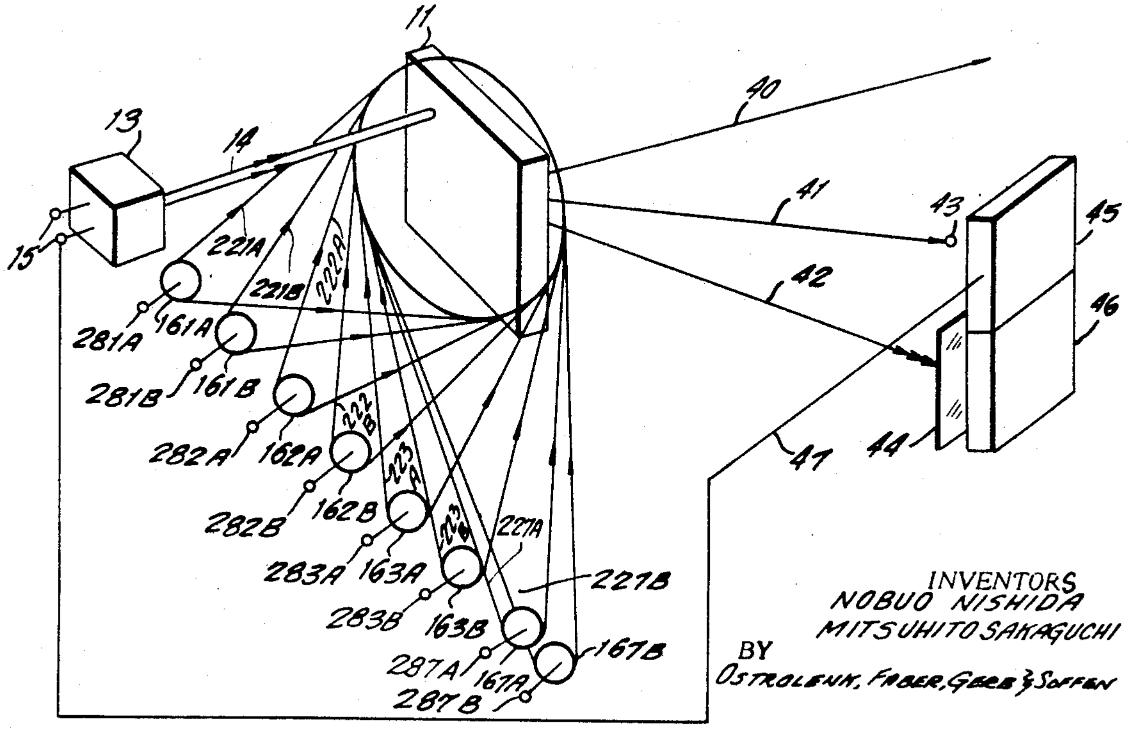

Now the invention will be described in conjunction with the accompanying drawings, in which:

FIG. 1 schematically shows a cross-sectional view of the recording plate to illustrate the formation of the interference patterns in the volume holography fashion or, in a direction transverse to the plane of the plate;

FIG. 2 shows a similar view of the recording plate to illustrate the Bragg's reflection in the read-out stage;

FIG. 3 schematically shows an embodiment of the present invention in its write-in phase; and FIG. 4 schematically shows the embodiment in its read-out phase.

In FIG. 1, a pair of coherent light beams 2 and 3, projected onto a recording plate 1 with a certain angle formed therebetween, form interference pattern 7 lying in the direction of the bisector of the angle Θ formed between the beams. The thickness of the plate 1 is assumed to be at least several times as thick as the interval of the pattern 7. The pattern 7 is so formed by those cross-points 6 of the wave fronts 4 of beam 2 and wave fronts 5 of beam 3, which travels in the direction shown by thick lines as the light beams 2 and 3 travels in the direction shown by arrows. As will be seen from FIG. 1, if the angle of incidence of either the beam 2 or 3 is changed, the direction of the interference patter 7 is changed accordingly. It follows therefore that mutually different data can be stored in the plate 1 by slightly changing the angle of incidence of either or both of the beams 2 an 3.

Referring also to FIG. 2, in the read-out phase, a coherent light beam 8 is projected onto the interference pattern 7 formed in the plate 1 in the manner as shown in FIG. 1. The diffracted output light beam 10 is produced through the Bragg's reflection only when the angle of incidence satisfies the condition for the Bragg's reflection. Assuming that the plate 1 of FIG. 2 is produced through the process illustrated in FIG. 1, the primary diffraction output beam 10 is produced only when the angle of incidence of the beam 8 is equal to that of beam 2 or 3 (FIG. 1). With the angle of incidence of the beam 8 changed slightly from those of beams 2 and 3, the beam 8 is directly transmitted through the plate 1 to form a undiffracted beam 9.

As will be understood from the description of FIGS. 1 and 2, a slight change in the angle of incidence allows additional data to be recorded in the plate, thus realizing a high-density volume holographic recording. The improvement in the holographic associative memory which is obtained by the present invention is based on this volume-hologram type interference pattern recording.

Referring to FIG. 3, the embodiment in its write-in phase includes:

photographic plate 11 of a thickness sufficient to allow the recording of the interference pattern in a direction transverse to the major surface thereof; a saturable dye plate 12 capable of turning transparent when irradiated with light rays of an intensity higher than a threshold level; and a light beam deflector 13 for directing a sharp laser light beam 14 of high intensity in arbitrary directions. The deflector 13 has a laser light source and a supersonic deflector adapted to deflect the generated light beam in X and Y directions to designate numerous spots on the plate 12 from corner to corner.

The reference numerals 161A, 161B, 162A, ... and 167B denote light sources for generating diverging coherent light beams 221A, 221B, 222A, ..., and 227B of exactly equal wavelength. Each of these beams is arranged to illuminate the entire surface of plate 11. The presence and absence of each of the beams is controlled by a binary signal applied to the terminals 281A, 281B, 282A, ... and 287B of the light sources 161A, 161B, 162A, ... and 167B. As will be obvious to the engineers in this technical field, the light sources 161A—167B may actually be comprised of a combination of a single common laser light source, a light beam distributor for producing 14 parallel light beams from the output of the common light source, and a selective masking means for selectively intercepting the parallel light beams in response to the binary digits supplied to the terminals 281A—287B (only for the sake of illustration, the light sources are shown as separate members). The devices 161A—167A, 161B—167B, 281A—287A and 281B—287B may, for example, be of the type shown in FIGS. 4a and 4b of copending application 812,069.

The reference numeral 34 denotes a strip of microfilm, a slide or other like member containing the data to be stored and retrieved (to be described later). This slide may include analogue data taking the form of optical image printed on it. Also, it may have a number of binary digits printed thereon. These data may be arranged in one direction or in X and Y coordinates.

The data plate 34 is illuminated by coherent light rays 35 diffused by a diffusing plate 34A formed of an opal glass plate or a flys' eye lens. The light rays 35 are spatially modulated by the data plate 34 and projected on the entire surface of the dye plate 12. Since the light rays 35 are diffused, light rays originating from each of numerous points on the data plate are projected on the entire surface of the plate 12. Y-light numeral 36 denotes a plurality of coherent light sources arranged in a plane adjacent to the data plate 34. The light sources 36 serve as a marking beam specific to each of the data plates. In this embodiment, the number of the light sources is assumed to be 100. This means that the embodiment is capable of storing 100 different data plates 34. As will be obvious to engineers in this technical field, these light sources 36 are actually made of a combination of a single light source, X- and Y- light beam distributing means, and a selective masking means, as is the case with the light sources 161A—167B. The light rays emanating from each of the light sources 36 are projected on the entire surface of the plate 12 by means of light diffusing or diverging means not shown. The scanning device 13 is disposed adjacent to the light sources 161A—167B while the marking light sources 36 are disposed adjacent to the data plate 34. The combination of the scanning device 13 and light sources 161A—167B is disposed separate from that of the light sources 36 and data plate 34.

In a write-in operation, a 7-digit parallel binary signal, and its complement, is applied to terminals 281A, 281B, 282A, ... 287B. The binary signal serves as an address given to a specific one of the data plates 34. In this embodiment, each combination of 7-digit binary signals is respectively assigned to an associated one of the 100 different data plates 34. To make the "associative"data retrieval possible in the read-out phase, each of the digits of the parallel binary signal is applied to the corresponding one of the terminals 281A—287B always together with its complementary value. For example, if the first digit of the binary signal is 1, the binary digit 1 is applied to the terminal 281A assigned to the true value 1 of the first digit, while another terminal 281B is left unsupplied with any binary voltage. The same applies to all the other terminal combinations 282A—282B, 283A—283B, ..., and 287A—287B. Thus, assuming that the binary signal is (1001110), the voltage representative of the binary digits is supplied to terminals 281A, 282B, 283B, 284A, 285A, 286A, and 287B. Since those ones of light sources 161A to 167B are caused to generate the coherent light rays which are supplied with the voltage input at their terminals, this way of applying the voltage makes it possible to carry out the recording of the complementary value of each digit along with its true value. As is detailed in the copending application, the simultaneous recording of the tube and complimentary values is essential to the "associative" retrieval in the read-out phase.

On the other hand, the diffused light rays 35 spatially modulated by the data plate 34 are projected onto the plate 12 along with the specific one of the marking light sources 36. Simultaneously with the illumination by the light beams 221A—227B, light rays 38 and 37, the position-designating beam 14 is produced by the deflector 13 in response to the address signal given to the terminals 15. Illuminated by the beam 14, the spot on the dye plate 12 turns transparent allowing the light rays 221A—227B, 37, 38, and 14 to pass therethrough. Thus, the interference pattern formed between the light rays 221A—227B, 37, 38, and 14 is recorded immediately beneath the spot where the dye 12 turned transparent. This is repeated until all the 100 different data plates (34) are recorded, changing each of the marking light rays 37, spot-designating light beam 14, and binary light rays 221A—227B every time the plate 34 is changed.

Since the angle of incidence of light rays 37, 38 and 221A—227B is changed from one spot to another on the surface of the plates 12 (and consequently, on the surface of the plate 11), the stored data at one spot can be distinguished from those at another spot, based on the principle of the volume-memory-type recording described in conjunction with FIGS. 1 and 2.

In the data retrieving and read-out phase shown in FIG. 4, the spatial relationships of FIG. 3 between the deflector 13, light sources 161A—167B, and the photographic plate 11 is maintained. In addition to the constituent parts designated by the reference numerals common to FIG. 3, the embodiment comprises an array 45 of 100 photodiodes arranged in the row and column directions corresponding to the light sources 36, and a data display means. If the data to be read-out is in the analogue form such as an optical or photographic image, the means may be a screen 44. If the data is in the digital form such as printed binary digits, the display means may be photodiode array 46 similar to the array 45.

In the retrieval phase, interrogation data is supplied to the terminals 221A—287B of the light sources 221A—227B. As has been detailed in the copending application, the digital voltages supplied to these terminals 281A—287B represent the combination of bits respectively complementary to the interrogation data. To state more specifically the data retrieval process, let the interrogation data be (1XX0X01). This data requires that all stored data accompanied by those retrieval data signals should be selected from the stored data which have 1 in the most significant digit, 0 in the fourth most significant digit, 0 in the sixth most significant digit, and 1 in the least significant digit. The digit portions marked by "X" are the so-called "don't care" bits. In response to the interrogation data (1XX0X01), the interrogation light beam should illuminate the hologram plate 11 in the pattern (0XX1X10) to satisfy the condition of the "associative" read-out. To meet this requirement, the digital voltage is applied only at the terminals 281B, 284A, 286A, and 287B. The interrogation light beams thus emanating from light sources 161B, 164A, 166A, and 167B illuminate the entire surface of the hologram plate 11.

The illuminating light beams are diffracted by the hologram 11 through the Bragg's reflection at only those spots where the corresponding digits of the stored data are in coincidence with the digits represented by the interrogation light beams and where the condition for the Bragg's reflection are consequently satisfied. In the place where the diffraction FIG. 43 of the marking light beam is formed, the photodiode array 45 is disposed. The array 45 senses which ones of the 100 different data are selected. Those selected ones are not the data to be eventually selected, based on the principle of the "associative" data retrieval. Therefore, that one among the photodiodes of the array 45 which is not illuminated by the diffraction FIG. 43 is sensed by the array 45 and its addresses is (or their addresses are) fed back via lead 47 to the deflection means 13 to illuminate the spot corresponding to the unilluminated photodiode of the array 45. By this illumination, the retrieved data is projected on the display means 46 in the form of the diffraction FIG. formed through the Bragg's reflection. Thus, the retrieval and read-out of data are performed. If a plurality of the photodiodes are not illuminated as a result of the illumination by the interrogation beams, the so-called ordered retrieval means is inserted in the midst of the wiring 47 to convert the multicoincidence state to the single-coincidence state. Since this processing is detailed in the copending application, no further description will be given here.

As will be seen from the foregoing, the associative memory system of the present invention has made it possible to remarkably increase the capacity of the holographic associative memory system, resorting to the volume hologram.

In the embodiment shown in FIG. 1, photographic plate 11 coupled with the saturable dye plate 12 may be replaced with a combination of a photochromic plate and a movable means. Also, it goes without saying that the number of the different data plates to be stored may be much greater than 100. It will be apparent also that all the modifications possible to the system of the copending application are also applicable to the present system.

I claim:

1. An associative memory system employing holographic techniques comprising:
a first light wave modulator for spatially modulating diffused coherent light rays in response to data to be stored;
a second light wave modulator having means for selectively intercepting, in response to retrieval data given in one-to-one correspondence to said data to be stored, a plurality of parallel coherent light rays;
a third light wave modulator for selecting from a plurality of parallel coherent light beams at least one beam to give marking in one-to-one correspondence to each of said data to be stored;
a coherent light beam source for directing a thin coherent light beam to an arbitrary direction; and means for recording the interference pattern formed between the output light rays of said light wave modulators and said light beam source only at the spot illuminated by said light beam source;
wherein the light wave modulation at said second light wave modulator being such that each bit of said retrieval data is represented by the presence of either of a pair of said parallel light beams and wherein the interference patterns are formed in the recording means in a direction transverse to the plane thereof; and
whereby each of said bits of said retrieval data being recorded in the recording means in the form of said interference pattern, by its complementary value.

2. An associative memory employing holographic techniques wherein at least two space modulated beams are employed to form an interference pattern comprising:
a recording plate at least several times as thick as an interference pattern;
first means positioned in front of said recording plate for normally preventing light rays from passing therethrough so as to strike said recording plate;
second means for generating a coherent light beam of narrow beam width and including means for deflecting said coherent beam to one of a plurality of small regions across said first means to enable light rays striking said first means in the region of said first means illuminated by said coherent light beam to pass therethrough and strike an associated region of said recording plate;
a first source of coherent light capable of being spaced modulated by one of a plurality of data plates, which selected data plate is positioned between said first source of coherent light and said recording plate for space modulating light rays emitted from said first source in accordance with data stored in said data plate;
third means for generating a plurality of pairs of spaced parallel coherent light rays;
said third means including fourth means for modulating said pairs of parallel light rays with binary signals which constitute retrieval data uniquely related to one of said data plates;
a first plurality of coherent light marking sources at least equal in number to the number of different data plates and each being physically disposed at a different position in space;
means for illuminating only that coherent light source within the first plurality of coherent light sources which is associated with the data plate positioned between said first source and said recording plate;
said space modulated light rays generated by a data plate; said selectively modulated pairs of parallel coherent light rays and said selected coherent light marking ray combining to form an interference pattern in said recording plate in the region of said recording plate associated with the region of said first means illuminated by said narrow beam width coherent light beam whereby said interference pattern is disposed in said recording plate in a direction transverse to the surface of said recording plate.

3. The associative memory of claim 2 further comprising;
an array of light sensitive devices disposed in space in the same manner as said first plurality of coherent light sources and being positioned behind said recording plate;
viewing means positioned behind said recording plate and adjacent said array of light sensitive devices;
said array being adapted to means coupled to said array of light sensitive devices for operating said deflecting means to deflect said coherent light beam of narrow beam width to strike a region on said first means which corresponds to that light sensitive device which is not illuminated upon the complement of one of the binary signals applied to said fourth means for data retrieval purposes to thereby display said retrieval data upon said viewing means.

4. A holographic method for recording data in a recording plate wherein each group of data is contained in a separate data plate comprising the steps of:
assigning a binary code to each data plate;
spatially modulating a first coherent light source with one of said data plates to direct the space modulated rays toward said recording plate;
spatially modulating a second coherent light source into first and second groups of spatially modulated parallel light beams directed toward the recording plate wherein said first group of parallel light beams is modulated in accordance with the binary code assigned to the data plate modulating the first coherent light source and wherein said second group of parallel light beams is modulated by the complement of the binary code;

directing the light rays of a third coherent light source toward said recording plate wherein the angle of incidence of the light rays from said third coherent light source is different for each data plate used to spatially modulate the first coherent light source;

assigning a different small region of said recording plate to each data plate and enabling only that region assigned to the particular data plate being used to spatially modulate said first coherent light source to be exposed to light rays while preventing all remaining regions from being exposed to light rays, whereby the interference pattern formed in the recording plate lies in a direction transverse to the surface of the recording plate exposed to the light rays.

5. A method for retrieving data stored in a recording plate in the form of interference patterns generated by the method steps of claim 4 comprising the steps of:

i. modulating the first and second groups of parallel light beams by the complement of those binary positions for which retrieval information is desired;
ii. illuminating the entire recording plate with the beams generated in step (i);
iii. sensing at the rear of said recording plate each region of said recording plate into which data groups have been stored to detect the absence of a light ray passing therethrough;
iv. enabling light rays generated by step (i) to sequentially illuminate only those regions on a one-at-a-time basis for which no light ray was detected at each region along the rear of said recording plate;
v. observing each of the data groups at the rear of the recording plate.